W. A. BERGER.
DUMPY LEVEL.
APPLICATION FILED SEPT. 21, 1908.
994,903.
Patented June 13, 1911.
2 SHEETS—SHEET 1.
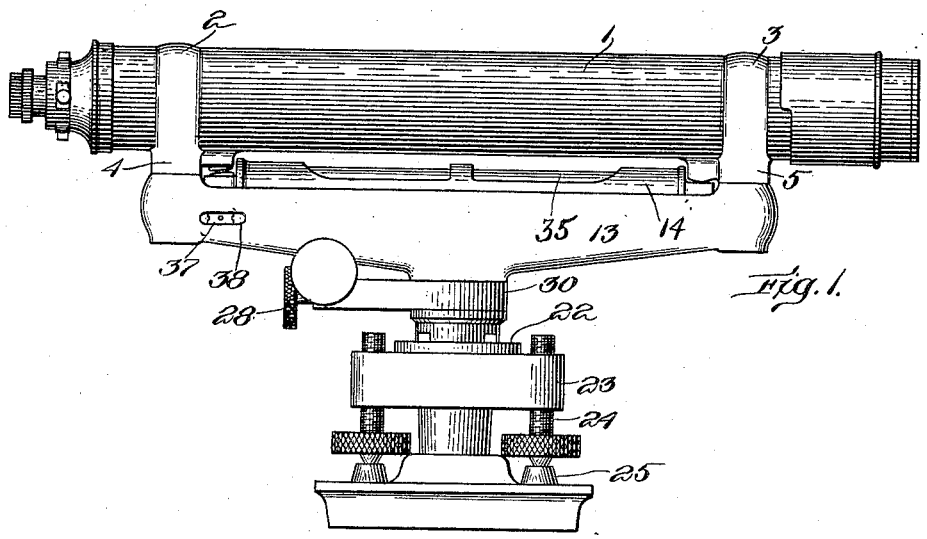
Fig. 1.
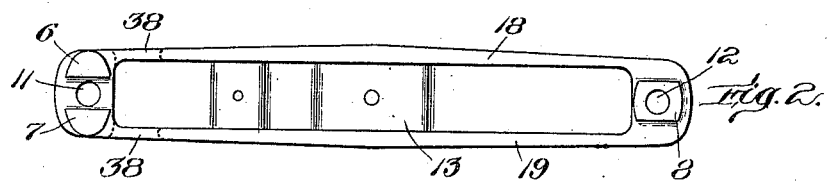
Fig. 2.
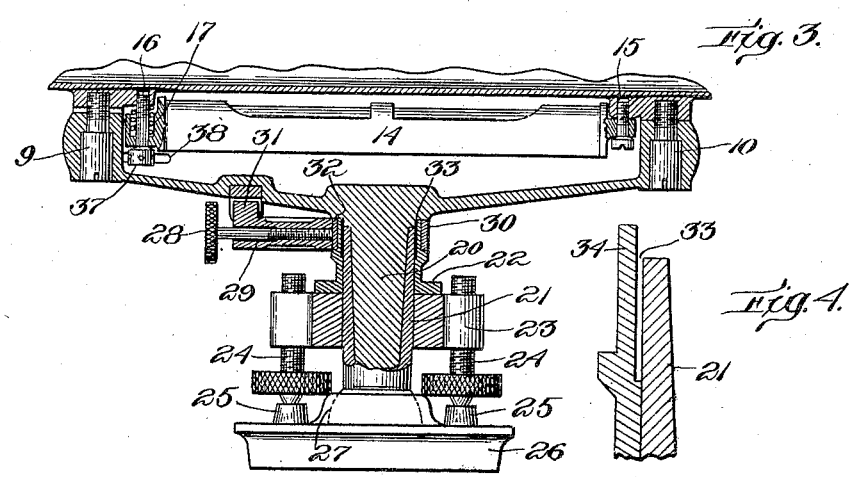
Fig. 3.
Fig. 4.
Witnesses:
Louis Brown
Parker B. Fiske
Inventor:
William A. Berger,
by Geo. H. Maxwell
Atty.

W. A. BERGER.
DUMPY LEVEL.
APPLICATION FILED SEPT. 21, 1908.
994,903.
Patented June 13, 1911.
2 SHEETS—SHEET 2.
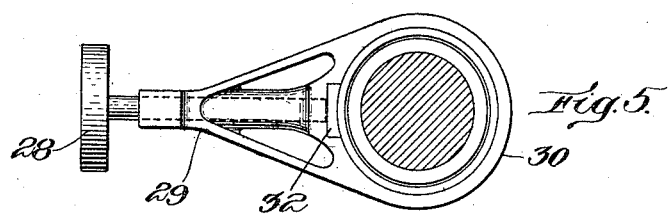
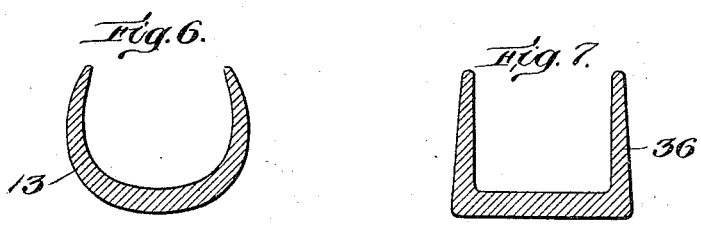
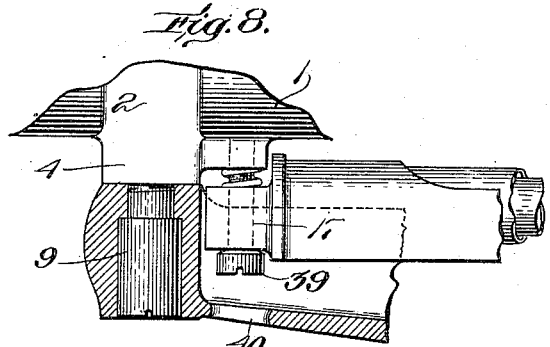
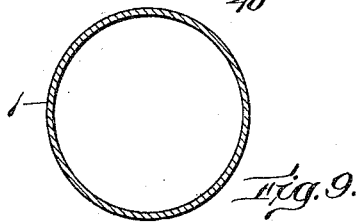
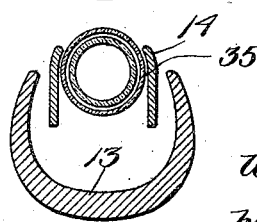
Inventor:
William A. Berger,
by Geo. S. Maxwell
Atty.
Witnesses:
Louis Brown
Parker B. Fiske

UNITED STATES PATENT OFFICE.

WILLIAM A. BERGER, OF BOSTON, MASSACHUSETTS.

DUMPY-LEVEL.

994,903.  Specification of Letters Patent.  Patented June 13, 1911.

Application filed September 21, 1908. Serial No. 453,924.

*To all whom it may concern:*

Be it known that I, WILLIAM A. BERGER, a citizen of the United States, residing at Boston, in the county of Suffolk and State of Massachusetts, have invented an Improvement in Dumpy-Levels, of which the following description, in connection with the accompanying drawings, is a specification, like letters on the drawings representing like parts.

The main objects of my invention are to increase the accuracy and reliability of this important kind of instrument and to decrease the size, weight and expense thereof and to bring the whole mechanism down into a long, vertically narrow, compact mass or body. In order better to protect the fine spirit level used in these instruments from the sun and air currents and from the bodily heat of the manipulator in reading it, I lower the telescope, securing it by end bands, as distinguished from the usual Y's, and make the longitudinal cross-bar (heretofore made straight and strengthened by external ribs) of a trough-shaped form, which nearly incases the spirit level, preferably also being inclosed by another glass tube. As the telescope is brought down as close as possible, in fact almost touching the spirit level, it protects the latter largely from injury and the trough-shaped support protects the level from the air currents and the like. This construction gives great compactness, increased strength to support the telescope, and lowers the height of the entire instrument, features which are of great importance in an instrument of precision of this kind, in which the ether in the spirit level is so sensitive that, as is well known, the position of the air bubble is affected by even the breath of the operator in reading it. I secure extreme certainty and accuracy of position of the telescope by employing end bands or rings immovably encircling the telescope and perminently clamped to the main support by two screws coöperating with three bearings, two bearings at one end of the telescope and one at the other, as distinguished from having the telescope supported in Y's by a screw and nut adjustable to bring the line of collimation of the telescope into proper horizontal position. I secure extreme accuracy by providing the three rests mentioned, extending exactly at right angles to the center line of the instrument, said construction also constituting an important feature in enabling me to accomplish the main object of protecting the level and constructing the instrument so that they offer a minimum resistance to air currents or a strong wind. This prevents "the level from walking" as known to surveyors. Preferably the spirit level is adjusted through a narrow slot or small concealed opening in the trough-shaped support or cross-bar, so that the adjusting screw is protected. Preferably the cross-bar is made tapering toward each end and has its walls also tapering, being thicker at the center and decreasing in thickness toward the ends, whereby lightness is secured, together with great lateral and longitudinal strength, and this shape, taken in connection with the compact, low-down mounting of the telescope, with the level partially embraced by the trough of the cross bar, reduces the error due to wind pressure to a minimum. The narrowing of the cross bar in a horizontal plane toward its ends prevents disturbance from an endwise wind, and the narrowing thereof vertically upward or providing it with bulging sides prevents disturbance from a sidewise wind. Both of these features unite with the trough and low-mounted, overhanging telescope to shield the level from the wind, and from the bodily heat of the user and from his breath, etc. Especially in a mine, the surveyor is obliged to get very close to see the bubble, and accordingly it is of material advantage to have the cross bar so shaped as to divert most of the breath and heat away from the spirit level, as is done by the curved surfaces and narrowed, sloping shape of the cross bar.

Another important feature of my invention resides in providing the clamping adjustment of the socket in which turns the vertical center of the instrument with means for preventing distortion thereof and consequent displacement of the level. While such displacement as has commonly taken place has usually been, in the best made instruments, minute, I have found that it is usually present to a sufficient degree to render the results, when leveling on a large scale or over a large territory, unreliable; and accordingly my invention provides, in connection with the above features for securing compactness and accuracy, means for preventing this distortion or possible deflection by the clamping screws.

In the accompanying drawings, in which I have shown a preferred embodiment of my invention: Figure 1 shows, in side elevation, the top or head of my improved dumpy level ready to be placed on a usual tripod; Fig. 2 is a plan view of the cross-bar; Fig. 3 is a central longitudinal vertical section of the main supporting details; Fig. 4 is a vertical cross sectional view to illustrate the principle of the clamping feature of my invention; Fig. 5 is a plan view of the clamping mechanism; Fig. 6 is a cross sectional view of the preferred trough-shaped form of cross-bar, and Fig. 7 is a similar view of another form; Fig. 8 is an enlarged sectional detail showing a modified form of spirit level adjusting means; and Fig. 9 shows, in cross section, the protecting cover-glass or tube preferably provided for the spirit level.

It will be understood that the telescope 1 and its various arrangements or adjustments may be of any usual or preferred kind and accordingly I have not shown details thereof. The telescope, according to my invention, is preferably secured at its opposite ends by bands or rings 2, 3, tightly and immovably fitted to the outer barrel of the telescope and provided at their lower ends with hub-like portions 4, 5, respectively, seated flat upon plain bearing surfaces or rests 6, 7, 8, to which said rings, and hence the telescope, are clamped by centrally disposed screws 9, 10, entering through holes 11, 12. The rest or bearing 8 is in the longitudinal center of a cross bar or main support 13 at one end thereof and the rests or bearings 6, 7, are separated from each other as widely as the width of the cross bar will permit at the opposite end of said cross bar, all three of said rests having their top plane surfaces raised above the adjacent metal so as to afford a three-point support for receiving the telescope and its holding rings 2, 3. Secured to the underside of the telescope 1 in usual or preferred manner is a spirit level 14, herein shown as held at one end by a screw 15 and at the other end by an adjusting screw 16 and an opposed coöperating spring 17. The holding rings 2, 3 and the three-point support thus far described permit the spirit level to be brought so close to the cross-bar that the spirit level can depend into the latter and be protected thereby, said cross-bar, for this purpose, being trough-shaped, as best shown in Figs. 2, 3 and 6, having opposite side walls 18, 19, thicker at the bottom and gradually becoming thinner toward their top edges and also thicker at the longitudinal middle, see Fig. 2, and tapering to the opposite ends, said cross-bar, when viewed sidewise, having also a general taper, being deeper at the middle and narrower or shallower at its ends, and when viewed in plan, being wider at the middle and narrower toward the ends, see Fig. 2. The external shape of the cross bar offers the least resistance to the wind from whatever direction the latter may come, while the interior shape best protects the spirit level and coöperates with the overhanging, low-mounted telescope in sheltering the spirit level under all circumstances. The external and internal shape described and the coöperating construction are particularly important in preventing the instrument from walking, and in keeping the spirit level free from the influence of the heat and breath of the surveyor when reading it.

At its center, the cross-bar is provided with a usual tapering spindle or vertical axle 20 which fits snugly in a sleeve 21, secured rigidly by a collar 22 to a usual casting or block 23 provided with usual leveling screws 24 whose feet 25 rest flat against the plane top surface of the head-plate 26 of the instrument. The lower end of the tapering sleeve 21 has a usual ball and socket bearing at 27. A usual clamping screw 28 is mounted in a clamping bracket 29 whose band 30 surrounds the upper end of the socket or supporting member in which the vertical axis 20 turns, said bracket 29 being held at 31 in usual manner to the cross-bar. A usual steel block or wear-plate 32 is provided for the screw 28 to bear against. This clamping construction, as thus far described, is the same as usual and I have found that when tightened against the socket or stationary outer member, the clamping action of the screw has been sufficient to deflect the instrument to a sufficiently appreciable extent to vary the position of the bubble in the spirit level. Accordingly to counteract this tendency and render this deflection impossible, I provide in the socket member a groove or annular recess 33, as best shown in Fig. 4, so that all the distorting or deflecting tendency of the clamping member takes on the projecting upper end of the outer portion 34 of the socket member, and as said portion is separated by the air gap or groove 33 from the inner portion which bears against the vertical axis 20, the result is that such yielding or distorting movement as may be due to the clamping movement, is not transmitted to the level proper, but the latter remains entirely undisturbed. The main purpose of all the features of my invention is to render the instrument in use perfectly reliable, as nearly as possible; so that, for example, the reading of the spirit level may be always depended upon. As a still further means to this end, I surround the spirit level with a glass tube or covering 35 whereby the bubble is still further protected from the influence of air currents, changes in temperature, etc.

As already intimated, I do not intend to restrict my invention to the precise constructional details shown and described, as it is obvious that many changes in form and arrangement may be resorted to within the spirit and scope of my invention in its broader aspects. I prefer, for instance, to have the trough semicircular or outwardly swelled at its sides so that it will offer the least resistance to air currents, but consider the feature broadly of having the cross-bar made trough-shape as my invention. In Fig. 7, I have shown the same at 36 as rectangular in cross-section. Also, for instance, while I prefer to provide the screw 17 with a capstan head 37 to be operated by a pin or lever inserted through a slot 38 in the side of the cross-bar, as shown in Figs. 1–3, said screw may have an ordinary slotted head 39, as shown in Fig. 8, operated by a screwdriver through an opening 40 in the underside of the cross-bar.

Having described my invention, what I claim as new and desire to secure by Letters Patent is:

1. In a surveyor's level, a telescope, a spirit level secured to the under side of the telescope, and a cross-bar for supporting said telescope, trough-shaped in cross-section for receiving said down-hanging spirit level.

2. In a surveyor's level, a cross-bar support mounted to turn horizontally on a vertical axis, said cross-bar being hollow and having its external sides convex, when viewed in vertical cross-section, to offer minimum resistance to the wind, a telescope mounted immediately above and directly on said cross-bar, and a spirit-level between said cross-bar and telescope, partially embraced by the sides of the cross-bar, for protection against air currents, with an intervening space between said sides of the cross-bar and the spirit level.

3. In a surveyor's level, a cross-bar support mounted to turn horizontally on a vertical axis, said cross-bar being hollow and having its external surface approximately semi-cylindrical in cross section, to offer minimum resistance to the wind, a telescope mounted immediately above and directly on said cross-bar, and a spirit level between said cross-bar and telescope, partially embraced by the sides of the cross-bar, for protection against air currents, with an intervening space between said sides of the cross-bar and the spirit level.

4. In a surveyor's level, a telescope, a trough-shaped cross-bar supporting said telescope, and a spirit level mounted between said telescope and cross-bar within the trough of the latter, and means inclosed within the cross-bar and externally operable for adjusting said spirit level toward or from the telescope.

5. In a surveyor's level, a telescope, a trough-shaped cross-bar supporting said telescope, and a spirit level mounted between said telescope and cross-bar within the trough of the latter, and means inclosed within the cross-bar for adjusting said spirit level, said cross-bar having an opening through its walls for the admission of a tool to operate said adjusting means.

6. In a surveyor's level, a telescope, a spirit level, supporting means for the spirit level, and a cross-bar, said cross-bar having a three-point support for said telescope, one at one end thereof and the other two at the other end thereof, and means for permanently clamping the telescope immovably on said three points of support.

7. In a surveyor's level, a telescope, a spirit level, a cross-bar, and end bands permanently retaining the telescope adjacent its opposite ends, said bands and the opposite ends of the cross-bar having complemental bearing surfaces, and tightening means for tightening said complemental bearing surfaces together.

8. In a surveyor's level, a telescope and cross-bar mounted permanently together close to each other, combined with a spirit level mounted directly on the under-side of the telescope and partially embraced by the cross-bar.

9. In a surveyor's level, a telescope, a spirit level, a cross-bar, a leveling socket in which the cross-bar is mounted on a vertical axis to rotate horizontally, and clamping means held by the cross-bar to engage said leveling socket for holding the cross-bar against rotation, said leveling socket having pressure receiving means coöperating with said clamping means to receive the clamping pressure capable of receiving clamping distortion without transmitting it to adjacent parts.

10. In a surveyor's level, a telescope, a spirit level, a leveling socket, a cross-bar for supporting said telescope mounted to turn about a vertical axis in said socket, and a clamping member for clamping said socket and cross-bar against relative movement, said socket having a yielding portion to be engaged by said clamping member for preventing the transmission of distorting clamping strains to the rest of the instrument.

11. In a surveyor's level, a telescope, a spirit level, and a cross-bar provided with a vertical axis, combined with a leveling socket for receiving said vertical axis, having a vertical groove formed in its upper edge thereby providing a yielding peripheral external flange projecting upwardly, and a clamping member retained by said cross-bar at one end and engaging said yielding flange at the other end.

In testimony whereof, I have signed my name to this specification, in the presence of two subscribing witnesses.

WILLIAM A. BERGER.

Witnesses:
 GEO. H. MAXWELL,
 LOUIS BROWN.

Copies of this patent may be obtained for five cents each, by addressing the "Commissioner of Patents, Washington, D. C."